(12) United States Patent
Makiuchi et al.

(10) Patent No.: US 9,650,492 B2
(45) Date of Patent: May 16, 2017

(54) RUBBER COMPOSITION FOR TIRES COMPRISING AN ACETYLACETONATE COMPOUND

(75) Inventors: Kazumi Makiuchi, Mie (JP); Salvatore Pagano, Tokyo (JP)

(73) Assignees: Michelin Recherche et Technique S.A., Granges-Paccot (CH); COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 914 days.

(21) Appl. No.: 13/321,826

(22) PCT Filed: May 12, 2010

(86) PCT No.: PCT/EP2010/056547
§ 371 (c)(1),
(2), (4) Date: Feb. 29, 2012

(87) PCT Pub. No.: WO2010/133492
PCT Pub. Date: Nov. 25, 2010

(65) Prior Publication Data
US 2012/0157585 A1    Jun. 21, 2012

(30) Foreign Application Priority Data
May 19, 2009  (FR) .................................... 09 02430

(51) Int. Cl.
| | |
|---|---|
| C08K 5/56 | (2006.01) |
| C08K 5/098 | (2006.01) |
| C08L 7/00 | (2006.01) |
| C08K 5/00 | (2006.01) |
| B60C 1/00 | (2006.01) |

(52) U.S. Cl.
CPC ............... *C08K 5/005* (2013.01); *B60C 1/00* (2013.01); *C08K 5/0091* (2013.01)

(58) Field of Classification Search
CPC ........... C08L 7/00; C08K 5/005; C08K 5/098; C08K 5/56; C08K 5/00
See application file for complete search history.

(56) References Cited

U.S. PATENT DOCUMENTS
2008/0132616 A1  6/2008  Reith

FOREIGN PATENT DOCUMENTS
| | | |
|---|---|---|
| EP | 1 712 590 | 10/2006 |
| JP | 54 047778 | 4/1979 |
| KR | 2001 0013425 | 12/2001 |
| WO | WO 2007098784 A1 * | 9/2007 |

\* cited by examiner

*Primary Examiner* — Brieann R Fink
(74) *Attorney, Agent, or Firm* — Cozen O'Connor

(57) ABSTRACT

Rubber composition which can be used in particular for the manufacture of tires, comprising at least a diene elastomer, a reinforcing filler, a crosslinking system, between 0.2 and 10 phr of an antioxidant, such as a substituted para-phenylenediamine, and between 0.2 and 10 phr of an acetylacetonate of an alkali metal or alkaline earth metal, chosen in particular from the group consisting of Li, Na, K, Mg, Ca and the mixtures of such metals. This acetylacetonate compound makes it possible to advantageously reduce the consumption of antioxidant during the thermo-oxidizing ageing of the composition. Metal/rubber composite comprising such a composition and at least a metal reinforcement. Tire comprising a such composition or such a composite.

16 Claims, 1 Drawing Sheet

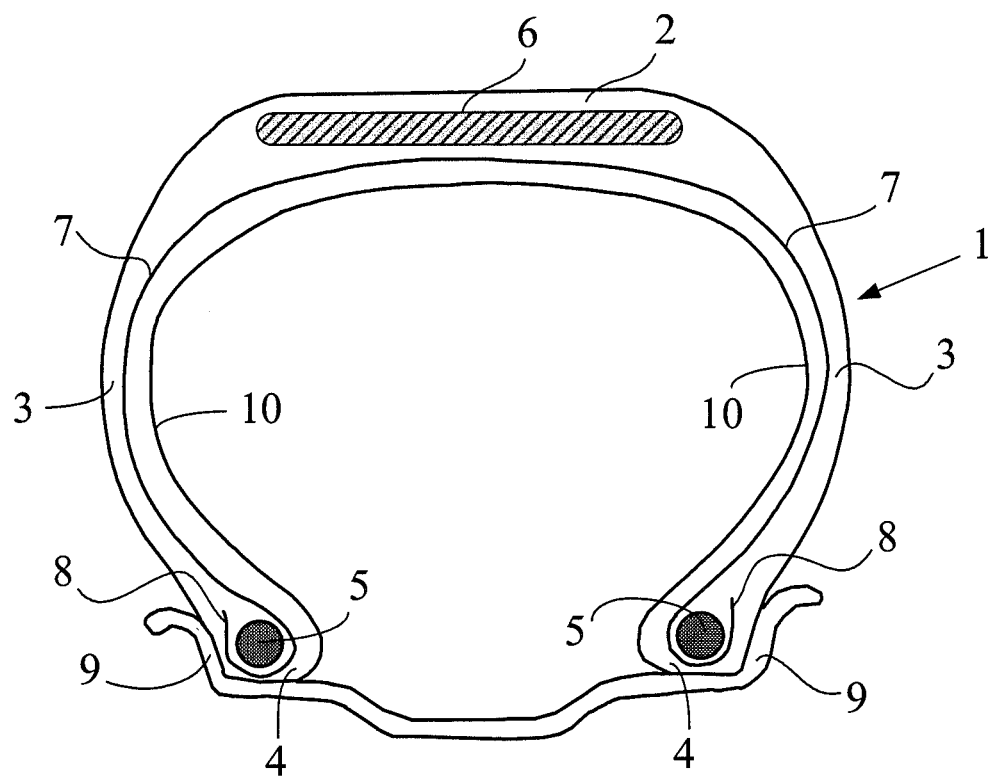

RUBBER COMPOSITION FOR TIRES COMPRISING AN ACETYLACETONATE COMPOUND

RELATED APPLICATION

This is a U.S. National Phase Application under 35 USC 371 of International Application PCT/EP2010/056547, filed on May 12, 2010.

This application claims the priority of French patent application No. 09/02430 filed May 19, 2009 the entire content of which is hereby incorporated by reference.

FIELD OF THE INVENTION

The field of the present invention is that of the rubber compositions which can be used in particular for the manufacture of semi-finished articles or products made of rubber, such as, for example, tires.

The present invention relates more particularly to antidegradant systems and agents intended to protect these rubber compositions against the ageing due to oxidation.

BACKGROUND OF THE INVENTION

As is known, essentially unsaturated diene rubber vulcanisates, both natural and synthetic, due to the presence of double bonds on their molecular chains, are liable, if they are not protected, to deteriorate more or less rapidly after prolonged exposure to the atmosphere, due to known oxidation mechanisms. These complex mechanisms have been restated, for example, in the patent documents WO 99/02590 and WO 99/06480. They result, subsequent to cleavages of these double bonds and to the oxidation of the sulphur bridges, in a stiffening and a weakening of the vulcanisates, which damage is additionally accelerated under the joint action of heat, by "thermal-oxidation", or also of that of light by "photo-oxidation".

It has been possible to gradually inhibit these oxidation phenomena by virtue of the development and marketing of various antioxidants, including in particular p-phenylenediamine ("PPD" or "PPDA") derivatives, such as, for example, N-isopropyl-N'-phenyl-p-phenylenediamine ("I-PPD") or N-(1,3-dimethylbutyl)-N'-phenyl-p-phenylenediamine ("6-PPD"), or quinoline derivatives ("TMQ"), simultaneously excellent antioxidants and antiozonants (see, for example, Patent Applications WO 2004/033548, WO 2005/063510 and WO 2005/133666). These antioxidants are today used systematically in diene rubber compositions, in particular in compositions for tires, in order to combat ageing and premature wear of the latter.

The well-known disadvantage of these antioxidants is that their concentration in the rubber compositions naturally decreases over time due to their very chemical function and that they have, in addition, a strong natural propensity to migrate from the regions more concentrated in antioxidant towards the regions less concentrated in antioxidant, so much so that a person skilled in the art is led to use relatively large amounts of product, which is relatively expensive and furthermore harmful to the appearance of the finished products, due to a high staining power of a large number of antioxidants, in particular p-phenylenediamine derivatives.

In order to overcome the above disadvantages and thus to further improve the protection and the resistance to ageing of tires, the proposal has in particular been made to incorporate, in these tires, additional rubber layers having a high concentration of antioxidant, operating in a way as antioxidant reservoirs capable of delivering the antioxidant with the passage of time, by migration, as a function of the degree of depletion of the adjacent regions (see, for example, the patent documents WO 2009/029114, EP 1 319 527 or U.S. Pat. No. 7,082,976).

The use of such antioxidant reservoirs, although effective, however exhibits the disadvantage of having to modify the internal structure of the tires and consequently in particular of making it more complex and more expensive to manufacture them.

Consequently, the designers of diene rubber articles, in particular tire manufacturers, are today looking for simple novel solutions which make it possible to overcome, at least in part, the abovementioned disadvantages.

SUMMARY OF THE INVENTION

During their research studies, the Applicants have discovered a novel rubber composition which, during the ageing thereof, has the distinguishing feature of consuming less antioxidant and which consequently makes it possible to meet the above objective.

Consequently, one-aspect of the invention is directed to a rubber composition, usable in particular in the manufacture of a tire, comprising at least a diene elastomer, a reinforcing filler, a crosslinking system, between 0.2 and 10 phr of an antioxidant and between 0.2 and 10 phr of an alkali metal or alkaline earth metal acetylacetonate.

By virtue of the presence of the above specific acetylacetonate, a significant reduction in the consumption of antioxidant has unexpectedly been observed in the rubber compositions during the ageing of the latter.

The longevity of rubber vulcanisates can thus be improved, in particular that of tires, which may be subjected, in a known way, to particularly severe running conditions, in particular under a humid and corrosive atmosphere.

A composition in accordance with an embodiment of the invention can be used for the manufacture of semi-finished articles or products made of rubber, particularly of tires, especially those intended to equip passenger motor vehicles, SUV (Sport Utility Vehicle) vehicles, two-wheel vehicles (in particular bicycles or motorcycles), aircraft, such as industrial vehicles chosen from vans, heavy-duty vehicles—that is to say, underground, bus, heavy road transport vehicles (lorries, tractors, trailers) or off-road vehicles, such as agricultural vehicles or earth moving equipment—or other transportation or handling vehicles.

Another aspect of the invention also relates to any semi-finished article or product made of rubber, in particular a tire, comprising a composition according to an embodiment of the invention.

A composition according to an embodiment of the invention can be used for the manufacture of a metal/rubber composite comprising a rubber composition and at least one metal reinforcing member capable of adhering to the said rubber composition.

Another aspect of the invention is directed to a metal/rubber composite comprising a diene rubber composition according to an embodiment of the invention and at least one metal reinforcing member capable of adhering to the said rubber composition.

Another subject-matter of the invention is a metal/rubber composite comprising a diene rubber composition according to the invention and at least one metal reinforcing member capable of adhering to said rubber composition.

BRIEF DESCRIPTION OF THE SINGLE DRAWING

The drawing is a diagrammatic representation, in radial cross section, of a tire with a radial carcass reinforcement in accordance with an embodiment of the invention, incorporating a composition according to an embodiment of the invention.

MEASUREMENTS AND TESTS USED

The rubber compositions according to the invention are characterized, before and after curing, as indicated below.

A) Mooney Plasticity

Use is made of an oscillating consistometer as described in French Standard NF T 43-005 (1991). The Mooney plasticity measurement is carried out according to the following principle: the composition in the raw state (i.e., before curing) is moulded in a cylindrical chamber heated to 100° C. After preheating for one minute, the rotor rotates within the test specimen at 2 revolutions/minute and the working torque for maintaining this movement is measured after rotating for 4 minutes. The Mooney plasticity (ML 1+4) is expressed in "Mooney unit" (MU, with 1 MU=0.83 N·m).

B) Scorch Time

The measurements are carried out at 130° C., in accordance with French Standard NF T 43-005 (1991). The change in the consistometric index as a function of time makes it possible to determine the scorch time of the rubber compositions, assessed in accordance with the abovementioned standard, by the parameter T5 (case of a large rotor), expressed in minutes, and defined as being the time necessary to obtain an increase in the consistometric index (expressed in MU) of 5 units above the minimum value measured for this index.

C) Rheometry

The measurements are carried out at 150° C. with an oscillating disc rheometer, according to Standard DIN 53529—part 3 (June 1983). The change in the rheometric torque as a function of time describes the change in the stiffening of the composition as a result of the vulcanization reaction. The measurements are processed according to Standard DIN 53529—part 2 (March 1983): $T_\alpha$ (for example $T_{95}$) is the time necessary to achieve a conversion of $\alpha$ %, that is to say $\alpha$ % (for example 95%) of the difference between the minimum and maximum torques.

D) Tensile Test

These tests make it possible to determine the elasticity stresses and the properties at break. Unless otherwise indicated, they are carried out in accordance with French Standard NF T 46-002 of September 1988. The modulus measurements were carried out under tension, unless expressly indicated otherwise according to Standard ASTM D 412 of 1998 (test specimen "C"); the true secant moduli, that is to say with respect to the actual cross section of the test specimen, are measured in second elongation (i.e., after a cycle of accommodation) at 10%, 100% and 300% elongation, respectively denoted E10, E100 and E300 and expressed in MPa (standard conditions of temperature and hygrometry according to Standard ASTM D 1349 of 1999). The breaking stresses (in MPa) and the elongations at break (in %) are also measured. All these tensile measurements are carried out under standard conditions of temperature (23±2° C.) and hygrometry (50±5% relative humidity), according to French Standard NF T 40-101 (December 1979).

DETAILED DESCRIPTION

In the present description, unless expressly indicated otherwise, all the percentages (%) shown are % by weight.

Moreover, any interval of values denoted by the expression "between a and b" represents the range of values extending from greater than a to less than b (that is to say, limits a and b excluded), whereas any interval of values denoted by the expression "from a to b" means the range of values extending from a up to b (that is say, including the strict limits a and b).

The composition of the invention is a rubber composition based (i.e., comprising the mixture or the reaction product) of at least a diene elastomer, a reinforcing filler, a cross-linking system and between 0.2 and 10 phr of an antioxidant; in addition, it has the novel and essential characteristic of comprising between 0.2 and 10 phr of an alkali metal or alkaline earth metal acetylacetonate.

A) Diene Elastomer

The term "diene" (or indiscriminately rubber) elastomer is understood to mean, in a known way, an elastomer resulting at least in part (i.e., a homopolymer or a copolymer) from diene monomers (monomers bearing two carbon-carbon double bonds which may or may not be conjugated).

Diene elastomers can be classified in a known way into two categories: those said to be "essentially unsaturated" and those said to be "essentially saturated". Generally, the term "essentially unsaturated" diene elastomer is understood here to mean a diene elastomer resulting at least in part from conjugated diene monomers having a level of units of diene origin (conjugated dienes) which is greater than 15% (mol %). Thus it is, for example, that diene elastomers such as butyl rubbers or copolymers of dienes and of α-olefins of EPDM type do not come within the preceding definition and can in particular be described as "essentially saturated" diene elastomers (low or very low level of units of diene origin, always less than 15%). In the category of "essentially unsaturated" diene elastomers, the term "highly unsaturated" diene elastomer is understood to mean in particular a diene elastomer having a level of units of diene origin (conjugated dienes) which is greater than 50%.

Given these definitions, the term diene elastomer capable of being employed in the compositions in accordance with the invention is understood more particularly to mean:

(a)—any homopolymer obtained by polymerization of a conjugated diene monomer preferably having from 4 to 12 carbon atoms;

(b)—any copolymer obtained by copolymerization of one or more conjugated dienes with one another or with one or more vinylaromatic compounds preferably having from 8 to 20 carbon atoms;

(c)—a ternary copolymer obtained by copolymerization of ethylene and of an α-olefin preferably having from 3 to 6 carbon atoms with a non-conjugated diene monomer preferably having from 6 to 12 carbon atoms, such as, for example, the elastomers obtained from ethylene and propylene with a non-conjugated diene monomer of the abovementioned type, such as, in particular, 1,4-hexadiene, ethylidenenorbornene or dicyclopentadiene;

(d)—a copolymer of isobutene and of isoprene (butyl rubber) and also the halogenated versions, in particular chlorinated or brominated versions, of this type of copolymer.

Although it applies to any type of diene elastomer, a person skilled in the art of tires will understand that the present invention is firstly employed with essentially unsaturated diene elastomers, in particular of the type (a) or (b) above.

More preferably, the diene elastomer is chosen from the group consisting of polybutadienes (BR), natural rubber (NR), synthetic polyisoprenes (IR), butadiene copolymers, isoprene copolymers and the mixtures of these elastomers. Such copolymers are more preferably chosen from the group consisting of butadiene/stirene copolymers (SBR), whether the latter are prepared by emulsion polymerization (ESBR) or in solution (SSBR), isoprene/butadiene copolymers (BIR), isoprene/stirene copolymers (SIR) and isoprene/butadiene/stirene copolymers (SBIR).

The elastomers can, for example, be block, random, sequential or microsequential elastomers and can be prepared in dispersion or in solution; they can be coupled and/or star-branched or also functionalized with a coupling and/or star-branching or functionalization agent. For coupling with carbon black, mention may be made, for example, of functional groups comprising a C—Sn bond or of aminated functional groups, such as benzophenone, for example; for coupling with a reinforcing inorganic filler, such as silica, mention may be made, for example, of silanol or polysiloxane functional groups having a silanol end (such as described, for example, in U.S. Pat. No. 6,013,718), of alkoxysilane groups (such as described, for example, in U.S. Pat. No. 5,977,238), of carboxyl groups (such as described, for example, in U.S. Pat. No. 6,815,473 or US 2006/0089445) or of polyether groups (such as described, for example, in U.S. Pat. No. 6,503,973). Mention may also be made, as other examples of such functionalized elastomers, of the elastomers (such as SBR, BR, NR or IR) of the epoxidized type.

The following are suitable: polybutadienes, in particular those having a content (molar %) of 1,2-units of between 4% and 80% or those having a content (molar %) of cis-1,4-units of greater than 80%, polyisoprenes, butadiene/stirene copolymers and in particular those having a Tg (glass transition temperature, measured according to Standard ASTM D3418) of between 0° C. and −70° C. and more particularly between −10° C. and −60° C., and/or a stirene content of between 5% and 60% by weight and more particularly between 20% and 50%, a content (molar %) of 1,2-bonds of the butadiene part of between 4% and 75% and a content (molar %) of trans-1,4-bonds of between 10% and 80%, butadiene/isoprene copolymers, in particular those having an isoprene content of between 5% and 90% by weight and a Tg of −40° C. to −80° C., or isoprene/stirene copolymers, in particular those having a stirene content of between 5% and 50% by weight and a Tg of between −25° C. and −50° C. In the case of butadiene/stirene/isoprene copolymers, those having a stirene content of between 5% and 50% by weight and more particularly of between 10% and 40%, an isoprene content of between 15% and 60% by weight and more particularly between 20% and 50%, a butadiene content of between 5% and 50% by weight and more particularly of between 20% and 40%, a content (molar %) of 1,2-units of the butadiene part of between 4% and 85%, a content (molar %) of trans-1,4-units of the butadiene part of between 6% and 80%, a content (molar %) of 1,2-plus 3,4-units of the isoprene part of between 5% and 70% and a content (molar %) of trans-1,4-units of the isoprene part of between 10% and 50%, and more generally any butadiene/stirene/isoprene copolymer having a Tg of between −20° C. and −70° C., are suitable in particular.

According to a specific embodiment, the predominant diene elastomer by weight (in particular for more than 50 phr) is an SBR, whether an SBR prepared in emulsion ("ESBR") or an SBR prepared in solution ("SSBR"), or an SBR/BR, SBR/NR (or SBR/IR), BR/NR (or BR/IR) or also SBR/BR/NR (or SBR/BR/IR) blend (mixture). This is the case in particular when the compositions of the invention are intended to constitute, in the tires, rubber matrices of certain treads (for example for passenger vehicles). In the case of an SBR (ESBR or SSBR) elastomer, use is made in particular of an SBR having a moderate stirene content, for example of between 20% and 35% by weight, or a high stirene content, for example from 35 to 45%, a content of vinyl bonds of the butadiene part of between 15% and 70%, a content (molar %) of trans-1,4-bonds of between 15% and 75% and a Tg of between −10° C. and −55° C.; such an SBR can advantageously be used as a mixture with a BR preferably having more than 90% (molar %) of cis-1,4-bonds.

According to another specific embodiment, the predominant diene elastomer by weight (in particular for more than 50 phr) is an isoprene elastomer. This is the case in particular when the compositions of the invention are intended to constitute, in the tires, rubber matrices of certain treads (for example for industrial vehicles), of crown reinforcing plies (for example of working plies, protection plies or hooping plies), of carcass reinforcing plies, of sidewalls, of beads, of protectors, of underlayers, of rubber blocks and other internal rubbers providing the interface between the abovementioned regions of the tires.

The term "isoprene elastomer" is understood to mean, in a known way, an isoprene homopolymer or copolymer, in other words a diene elastomer chosen from the group consisting of natural rubber (NR), synthetic polyisoprenes (IR), the various copolymers of isoprene and the mixtures of these elastomers. Mention will in particular be made, among isoprene copolymers, of isobutene/isoprene copolymers (butyl rubber—IIR), isoprene/stirene copolymers (SIR), isoprene/butadiene copolymers (BIR) or isoprene/butadiene/stirene copolymers (SBIR). This isoprene elastomer is preferably natural rubber or a synthetic cis-1,4-polyisoprene; use is preferably made, among these synthetic polyisoprenes, of the polyisoprenes having a level (molar %) of cis-1,4-bonds of greater than 90%, more preferably still of greater than 98%.

According to another specific embodiment, in particular when it is intended for a tire sidewall or for an airtight rubber (inner liner) of a tubeless tire (or other air-impermeable component), the composition in accordance with the invention can comprise at least one essentially saturated diene elastomer, in particular at least one EPDM copolymer or one butyl rubber (optionally chlorinated or brominated), whether these copolymers are used alone or as a mixture with highly unsaturated diene elastomers as mentioned above, in particular NR or IR, BR or SBR.

According to another specific embodiment of the invention, the rubber composition comprises a blend of a (one or more) "high Tg" diene elastomer exhibiting a Tg of between −70° C. and 0° C. and of a (one or more) "low Tg" diene elastomer of between −110° C. and −80° C., more preferably between −105° C. and −90° C. The high Tg elastomer is preferably chosen from the group consisting of S-SBRs, E-SBRs, natural rubber, synthetic polyisoprenes (exhibiting a level (molar %) of cis-1,4-structures preferably of greater than 95%), BIRs, SIRS, SBIRs and the mixtures of these elastomers. The low Tg elastomer preferably comprises butadiene units according to a level (molar %) at least equal to 70%; it preferably consists of a polybutadiene (BR) exhibiting a level (molar %) of cis-1,4-structures of greater than 90%.

In conclusion, the rubber composition of the invention can comprise just one or several diene elastomers, it being possible for this diene elastomer or these diene elastomers in addition to be used in combination with any type of synthetic elastomer other than a diene elastomer, indeed even with polymers other than elastomers, for example thermoplastic polymers.

B) Reinforcing Filler

The composition of the invention comprises any type of "reinforcing" filler known for its capabilities of reinforcing a rubber composition which can be used for the manufacture of tires, for example an organic filler, such as carbon black, a reinforcing inorganic filler, such as silica, with which a coupling agent is combined in a known way, or a mixture of these two types of filler.

Such a reinforcing filler typically consists of nanoparticles, the mean size (by weight) of which is less than a micrometer, generally less than 500 nm, most often between 20 and 200 nm, in particular and more preferably between 20 and 150 nm.

Preferably, the level of total reinforcing filler (in particular of silica or of carbon black or a mixture of silica and carbon black) is between 30 and 150 phr. Above 150 phr, there exists a to risk of increase in the hysteresis and thus in the rolling resistance of the tires. For this reason, the level of total reinforcing filler is more preferably comprised within a range from 40 to 120 phr.

As particularly preferred example, in particular for use in a rubber composition internal to the tire of the invention, use is made of 30 to 100 phr, in particular of 40 to 80 phr, of carbon black, of silica or of a mixture of silica and carbon black.

As another particularly preferred example, in particular for use in a rubber composition external to the tire of the invention, use is made of 40 to 150 phr, in particular of 50 to 120 phr, of carbon black, of silica, or of a mixture of silica and carbon black.

All carbon blacks, in particular blacks of the HAF, ISAF or SAF type, conventionally used in tires or their treads ("tire-grade" blacks) are suitable as carbon blacks. Mention will more particularly be made, among the latter, of the carbon blacks of the 100, 200, 300, 600 or 700 series (ASTM grades), such as, for example, the N115, N134, N234, N326, N330, N339, N347, N375, N550, N683 or N772 blacks. The carbon blacks might, for example, be already incorporated in the diene, in particular isoprene, elastomer in the form of a masterbatch (see, for example, Applications WO 97/36724 or WO 99/16600).

Mention may be made, as examples of organic fillers other than carbon blacks, of the functionalized polyvinyl organic fillers as described in Applications WO-A-2006/069792, WO-A-2006/069793, WO-A-2008/003434 and WO-A-2008/003435.

The term "reinforcing inorganic filler" should be understood here as meaning any inorganic or mineral filler, whatever its colour and its origin (natural or synthetic), also known as "white filler" or sometimes "clear filler" in contrast to carbon black, capable of reinforcing by itself, without means other than an intermediate coupling agent, a rubber composition intended for the manufacture of tires, in other words capable of replacing, in its reinforcing role, a conventional tire-grade carbon black; such a filler is generally characterized, in a known way, by the presence of hydroxyl (—OH) groups at its surface.

Mineral fillers of the siliceous type, preferably silica ($SiO_2$), are suitable in particular as reinforcing inorganic fillers. The silica used can be any reinforcing silica known to a person skilled in the art, in particular any precipitated or pyrogenic silica exhibiting a BET surface and a CTAB specific surface both of less than 450 $m^2/g$, preferably from 30 to 400 $m^2/g$, in particular between 60 and 300 $m^2/g$. Mention will be made, as highly dispersible precipitated silicas ("HDS"), for example, of the Ultrasil 7000 and Ultrasil 7005 silicas from Degussa, the Zeosil 1165 MP, 1135 MP and 1115 MP silicas from Rhodia, the Hi-Sil EZ150G silica from PPG or the Zeopol 8715, 8745 and 8755 silicas from Huber.

In order to couple the reinforcing inorganic filler to the diene elastomer, use is made, in a well-known way, of an at least bifunctional coupling agent (or bonding agent) intended to provide a satisfactory connection, of chemical and/or physical nature, between the inorganic filler (surface of its particles) and the diene elastomer. Use is made, in particular, of at least bifunctional organosilanes or polyorganosiloxanes.

Use is made in particular of silane polysulphides, referred to as "symmetrical" or "asymmetrical" depending on their specific structure, as described, for example, in Applications WO 03/002648 (or US 2005/016651) and WO 03/002649 (or US 2005/016650).

Silane polysulphides corresponding to the following general formula (I):

$$Z\text{-}A\text{-}S_x\text{-}A\text{-}Z, \text{in which:} \quad (I)$$

x is an integer from 2 to 8 (preferably from 2 to 5);
the symbols A, which are identical or different, represent a divalent hydrocarbon radical (preferably a $C_1$-$C_{18}$ alkylene group or a $C_6$-$C_{12}$ arylene group, more particularly a $C_1$-$C_{10}$, in particular a $C_1$-$C_4$, alkylene, especially propylene);
the symbols Z, which are identical or different, correspond to one of the three formulae below:

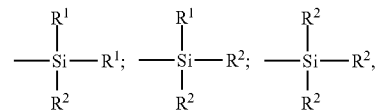

in which:
the $R^1$ radicals, which are unsubstituted or substituted and identical to or different from one another, represent a $C_1$-$C_{18}$ alkyl, $C_5$-$C_{18}$ cycloalkyl or $C_6$-$C_{18}$ aryl group (preferably, $C_1$-$C_6$ alkyl, cyclohexyl or phenyl groups, in particular $C_1$-$C_4$ alkyl groups, more particularly methyl and/or ethyl),
the $R^2$ radicals, which are unsubstituted or substituted and identical to or different from one another, represent a $C_1$-$C_{18}$ alkoxyl or $C_5$-$C_{18}$ cycloalkoxyl group (preferably a group chosen from $C_1$-$C_8$ alkoxyls and $C_5$-$C_8$ cycloalkoxyls, more preferably still a group chosen from $C_1$-$C_4$ alkoxyls, in particular methoxyl and ethoxyl),
are suitable in particular, without the above definition being limiting.

In the case of a mixture of alkoxysilane polysulphides corresponding to the above formula (I), in particular normal commercially available mixtures, the mean value of the "x" symbols is a fractional number preferably of between 2 and 5, more preferably approximately 4. However, the invention can also advantageously be employed, for example, with alkoxysilane disulphides (x=2).

Mention will more particularly be made, as examples of silane polysulphides, of bis(($C_1$-$C_4$)alkoxyl($C_1$-$C_4$)alkylsilyl($C_1$-$C_4$)alkyl)polysulphides (in particular disulphides, trisulphides or tetrasulphides), such as, for example, bis(3-trimethoxysilylpropyl) or bis(3-triethoxysilylpropyl)polysulphides. Use is in particular made, among these compounds, of bis(3-triethoxysilylpropyl)tetrasulphide, abbreviated to TESPT, of formula [($C_2H_5O$)$_3$Si($CH_2$)$_3$$S_2$]$_2$, or bis(triethoxysilylpropyl)disulphide, abbreviated to TESPD, of formula [($C_2H_5O$)$_3$Si($CH_2$)$_3$S]$_2$. Mention will also be made, as preferred examples, of bis(mono($C_1$-$C_4$)alkoxyldi($C_1$-$C_4$)alkylsilylpropyl)polysulphides (in particular disulphides, trisulphides or tetrasulphides), more particularly bis(monoethoxydimethylsilylpropyl)tetrasulphide, such as described in the abovementioned Patent Application WO 02/083782 (or U.S. Pat. No. 7,217,751).

Mention will in particular be made, as example of coupling agents other than an alkoxysilane polysulphide, of bifunctional POSs (polyorganosiloxanes) or of hydroxysilane polysulphides ($R^2$=OH in the above formula I), such as described, for example, in Patent Applications WO 02/30939 (or U.S. Pat. No. 6,774,255), WO 02/31041 (or US 2004/051210) and WO 2007/061550, or of silanes or POSs carrying azodicarbonyl functional groups, such as described, for example, in Patent Applications WO 2006/125532, WO 2006/125533 and WO 2006/125534.

Mention will be made, as examples of other silane sulphides, for example, of the silanes carrying at least one thiol (—SH) functional group ("mercaptosilanes") and/or at least one masked thiol functional group, such as described, for example, in Patents or Patent Applications U.S. Pat. No. 6,849,754, WO 99/09036, WO 2006/023815 and WO 2007/098080.

Of course, use might also be made of mixtures of the coupling agents described above, as described in particular in the abovementioned Application WO 2006/125534.

In the rubber compositions of the invention, when they are reinforced by an inorganic filler, such as silica, the content of coupling agent is preferably between 2 and 15 phr, more preferably between 3 and 12 phr.

A person skilled in the art will understand that a reinforcing filler of another nature, in particular organic nature, such as carbon black, might be used as filler equivalent to the reinforcing inorganic filler described in the present section, provided that this reinforcing filler is covered with an inorganic layer, such as silica, or else comprises, at its surface, functional sites, in particular hydroxyls, requiring the use of a coupling agent in order to form the connection between the filler and the elastomer. By way of example, mention may be made, for example, of carbon blacks for tires, such as described, for example, in the patent documents WO 96/37547 and WO 99/28380.

C) Crosslinking System

The crosslinking system is preferably a vulcanisation system, that is to say a system based on sulphur (or on a sulphur-donating agent) and on a primary vulcanisation accelerator. Various known vulcanisation activators or secondary accelerators, such as zinc oxide, stearic acid or equivalent compounds, or guanidine derivatives (in particular diphenylguanidine), incorporated during the first non-productive phase and/or during the productive phase, as described subsequently, are additional to this base vulcanisation system.

The sulphur is used at a preferable level of between 0.5 and 12 phr, in particular between 1 and 10 phr. The primary vulcanisation accelerator is used at a preferable level of between 0.5 and 10 phr, more preferably of between 0.5 and 5.0 phr.

Use may be made, as accelerator, of any compound capable of acting as accelerator for the vulcanisation of diene elastomers in the presence of sulphur, in particular accelerators of the type of the thiazoles and their derivatives, or accelerators of the types of zinc dithiocarbamates or thiurams. These primary accelerators are more preferably chosen from the group consisting of 2-mercaptobenzothiazyl disulphide (abbreviated to "MBTS"), N-cyclohexyl-2-benzothiazylsulphenamide (abbreviated to "CBS"), N,N-dicyclohexyl-2-benzothiazylsulphenamide (abbreviated to "DCBS"), N-(tert-butyl)-2-benzothiazylsulphenamide (abbreviated to "TBBS"), N-(tert-butyl)-2-benzothiazylsulphenimide (abbreviated to "TBSI") and the mixtures of these compounds.

D) Antioxidant

The composition of the invention has the characteristic of comprising between 0.2 and 10 phr of an antioxidant, preferably between 0.3 and 6 phr and more preferably between 0.5 and 4 phr of such an antioxidant.

The antioxidant used in the composition of the invention is any antioxidant capable of slowing down, in a known way, ageing of rubber vulcanisates attributable to the action of the oxygen.

Mention may in particular be made of derivatives of para-phenylenediamine (abbreviated to "PPD" or "PPDA"), also called, in a known way, substituted para-phenylenediamines, such as, for example, N-(1,3-dimethylbutyl)-N-phenyl-p-phenylenediamine (better known under the abbreviated term "6-PPD"), N-isopropyl-N-phenyl-p-phenylenediamine (abbreviated to "I-PPD"), phenyl-cyclohexyl-p-phenylenediamine, N,N'-di(1,4-dimethylpentyl)-p-phenylenediamine, N,N'-diaryl-p-phenylenediamine (DTPD), diaryl-p-phenylenediamine (DAPD), 2,4,6-tris[N-(1,4-dimethylpentyl)-p-phenylenediamino]-1,3,5-triazine, and the mixtures of such diamines.

Mention may also be made of derivatives of quinoline ("TMQ"), such as, for example, 1,2-dihydro-2,2,4-trimethylquinoline and 6-ethoxy-1,2-dihydro-2,2,4-trimethylquinoline.

Mention may also be made of substituted diphenylamines or triphenylamines, such as described, for example, in Applications WO 2007/121936 and WO 2008/055683, in particular 4,4'-bis(isopropylamino)triphenylamine, 4,4'-bis(1,3-dimethylbutylamino)triphenylamine or 4,4'-bis(1,4-dimethylpentylamino)triphenylamine.

Mention may also be made of dialkyl thiodipropionates or also of phenolic antioxidants, in particular of the family of the 2,2'-methylenebis[4-($C_1$-$C_{10}$)alkyl-6-($C_1$-$C_{12}$)alkyl-phenols], such as described in particular in the abovementioned Application WO 99/02590.

Of course, in the present description, the term "antioxidant" can denote both a single antioxidant compound or a mixture of several antioxidant compounds.

Preferably, the antioxidant is chosen from the group consisting of substituted p-phenylenediamines, substituted diphenylamines, substituted triphenylamines, quinoline derivatives and the mixtures of such compounds; more preferably still, the antioxidant is chosen from the group consisting of substituted p-phenylenediamines and the mixtures of such diamines.

E) Acetylacetonate

An essential characteristic of the composition in accordance with the invention is that it comprises between 0.2 and 10 phr of an acetylacetonate of an alkali metal or alkaline earth metal.

Below 0.2 phr, there is a risk of the targeted technical effect being inadequate, whereas, above 10 phr, the costs increase and the risk exists of a deterioration in certain mechanical properties of the compositions, in the initial state and after ageing. For these various reasons, the said level of acetylacetonate compound is preferably between 0.3 and 6 phr, more preferably still between 0.5 and 4 phr.

It is reiterated here that the group of the alkali metals is that of the monovalent chemical elements situated in the first column of the Periodic Table and not comprising hydrogen (H); in the order of the increasing atomic number, the alkali metals are lithium, sodium, potassium, rubidium, caesium and francium. The group of the alkaline earth metals is that of the chemical elements of Group 2 (or IIa) of the Periodic Table; by order of increasing atomic number, the alkaline earth metals are beryllium, magnesium, calcium, strontium, barium and radium.

Preferably, the metal of the acetylacetonate is chosen from the group consisting of Li (lithium), Na (sodium), K (potassium), Mg (magnesium), Ca (calcium) and the mixtures of such metals. More preferably still, the chosen acetylacetonate is magnesium acetylacetonate or calcium acetylacetonate.

Of course, in the present description, the term "acetylacetonate" can denote both a single acetylacetonate compound or a mixture of several acetylacetonate compounds.

The acetylacetonates described above, in particular those of calcium or magnesium, are well known and until now have been used mainly as catalyst for the polymerization of polymers (see, for example, WO 95/03348 and WO 96/03455) or also as stabilizers for polymers of polyvinyl chloride or PVC type (see, for example, Applications WO 97/40094 and WO 98/55440).

F) Other Constituents

The rubber compositions in accordance with the invention can also comprise all or a portion of the additives generally used in rubber compositions intended for the manufacture of tires, such as, for example, plasticizing agents or extending oils, whether the latter are aromatic or nonaromatic in nature, in particular very slightly aromatic or nonaromatic oils (e.g., paraffinic oils, or naphthenic oils which are hydrogenated, MES oils or TDAE oils), vegetable oils, ether plasticizers, ester plasticizers (for example, glycerol trioleates), fillers other than those mentioned above, for example lamellar fillers, plasticizing hydrocarbon resins exhibiting a high Tg, preferably of greater than 30° C., such as described, for example, in Applications WO 2005/087859, WO 2006/061064 and WO 2007/017060, and the mixtures of such compounds, other antidegradants or anti-ageing agents, such as, for example, antiozonants, vulcanisation accelerators, activators or retarders, antireversion agents, such as, for example, sodium hexamethylene thiosulphate or N,N'-m-phenylene-biscitraconimide, methylene acceptors and donors (for example, resorcinol, HMT or H3M) or other reinforcing resins, bismaleimides, or other systems for promoting adhesion with regard to metal reinforcing members, in particular brass reinforcing members, such as, for example, metal salts, such as organic salts of cobalt or nickel. A person skilled in the art will know how to adjust the formulation of the composition according to his specific requirements.

The rubber compositions of the invention can also comprise coupling activators, when a coupling agent is used, agents for covering the inorganic filler when an inorganic filler is used, or more generally processing aids capable, in a known way, by virtue of an improvement in the dispersion of the filler in the rubber matrix and of a lowering in the viscosity of the compositions, of improving their property of processing in the raw state. These covering agents are well known (see, for example, Patent Applications WO 2006/125533, WO 2007/017060 and WO 2007/003408); mention will be made, for example, of hydroxysilanes or hydrolysable silanes, such as hydroxysilanes or alkylalkoxysilanes, in particular alkyltriethoxysilanes, such as, for example, (1-octyl)triethoxysilane, polyols (for example, diols or triols), polyethers (for example, polyethylene glycols), primary, secondary or tertiary amines (for example trialkanolamines) or hydroxylated or hydrolysable polyorganosiloxanes (for example, α,ω-dihydroxypolyorganosilanes, in particular α,ω-dihydroxypolydimethylsiloxanes).

According to a preferred embodiment of the invention, in the case in particular where the composition of the invention is intended to constitute a calendaring matrix for a metal reinforcing member, the composition comprises, in combination with the acetylacetonate compound described above, at least one cobalt compound according to a preferred level of between 0.1 and 10 phr, more preferably between 0.3 and 6 phr and in particular between 0.5 and 4 phr. This is because it has been found that a certain synergy can exist between the two compounds, being reflected in addition by an improvement in the adhesive performance under hot and humid ageing conditions.

This cobalt compound is preferably an organic cobalt compound chosen more preferably from the group consisting of abietates, acetates, acetylacetonates, benzoates, butyrates, formates, linoleates, maleates, oleates, propionates, tallates, naphthenates, resinates, stearates and the mixtures (that is to say, salts, complexes, or other mixed derivatives) of such compounds, in particular from abietates, acetylacetonates, tallates, naphthenates, resinates and the mixtures of such compounds. Cobalt acetylacetonates, tallates and naphthenates are preferred in the majority of cases.

The term "metal reinforcing member" should be understood here as meaning any reinforcing component capable of reinforcing the rubber matrix, whether or not it is entirely metallic, at least the surface or external part of which intended to come into contact with the rubber is made of metal. This reinforcing member can be provided in various forms, preferably in the form of an individual thread (single thread), of a film (for example, a strip or a band) or of an assembly of threads, whether these threads are twisted together (for example, in the form of a cable) or essentially parallel to one another (for example, in a form of a bundle of threads, of a continuous fibre or also of a collection of short fibres).

In the composites and tires of the invention, this reinforcing member is more preferably provided in the form of an individual thread or of an assembly of threads, for example of a cable or of a strand manufactured with cable- or strand-producing devices and processes known to a person skilled in the art, which are not described here in order to keep the account simple.

Use is preferably made of a reinforcing member made of steel, in particular of pearlitic (or ferritic-pearlitic) carbon steel called, in a known way, "carbon steel", or also of stainless steel, such as described, for example, in Patent Applications EP-A-648 891 and WO 98/41682. However, it is, of course, possible to use other steels or other alloys. When a carbon steel is used, its carbon content is preferably between 0.1% and 1.2%, in particular between 0.5% and 1.1% (% by weight of steel); it is more preferably between 0.6% and 1.0%, such a content representing a good compromise between the mechanical properties required for the tire and the feasibility of the threads.

The metal reinforcing members and the cobalt salts which can preferably be used have, for example, been described in more detail in Patent Application WO 2005/113666.

In order to further improve the performance of the composition of the invention, in particular when the latter constitutes a calendering matrix for a metal reinforcing member, a specific embodiment consists in using a bismaleimide compound. This type of compound, which can be used without a curing agent, has curing kinetics well suited to those of tires, it is capable of activating the adhesion kinetics and it is capable of also improving, in the compositions in accordance with the invention, the endurance under conditions of humid ageing of the adhesive interphases.

It is reiterated that the bismaleimides correspond, in a known way, to the following formula:

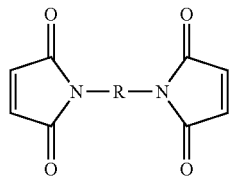

in which R is a substituted or unsubstituted, cyclic or acyclic, aromatic or aliphatic hydrocarbon radical, it being possible for such a radical to comprise a heteroatom chosen from O, N and S; this radical R preferably comprises from 2 to 24 carbon atoms.

Use is more preferably made of a bismaleimide chosen from the group consisting of N,N'-ethylene-bismaleimides, N,N'-hexamethylene-bismaleimides, N,N'-(m-phenylene)-bismaleimides, N,N'-(p-phenylene)-bismaleimides, N,N'-(p-tolylene)-bismaleimides, N,N'-(methylenedi-p-phenylene)-bismaleimides, N,N'-(oxydi-p-phenylene)-bismaleimides and the mixtures of these compounds. Such bismaleimides are well known to a person skilled in the art.

In the case where a reinforcing resin or a bismaleimide is used, it is present in the composition of the invention at a preferred level of between 0.1 and 20%, more preferably between 1 and 8%, by weight of rubber composition. For levels greater than the maxima indicated, risks exist of excessive stiffening of the compositions and thus of weakening of the compositions; for levels lower than the minima indicated, there is a risk of the targeted technical effect being inadequate.

G) Preparation of the Rubber Compositions

The compositions are manufactured in appropriate mixers using two successive preparation phases well known to a person skilled in the art: a first phase of thermomechanical working or kneading ("non-productive" phase) at high temperature, up to a maximum temperature of between 110° C. and 190° C., preferably between 130° C. and 180° C., followed by a second phase of mechanical working ("productive" phase) up to a lower temperature, typically of less than 110° C., finishing phase during which the crosslinking system is incorporated.

By way of example, the non-productive phase is carried out in a single thermomechanical stage of a few minutes (for example, between 2 and 10 min) during which all the base constituents necessary and other additives, with the exception of the crosslinking or vulcanisation system, are introduced into an appropriate mixer, such as a normal internal mixer. After cooling the mixture thus obtained, the vulcanisation system is then incorporated in an external mixer, such as an open mill, maintained at low temperature (for example, between 30° C. and 100° C.). The combined mixture is then mixed (productive phase) for a few minutes (for example, between 5 and 15 min).

Preferably, the alkali metal or alkaline earth metal acetylacetonate is introduced during the non-productive phase, at the same time as the antioxidant. However, the invention also applies to the case where all or only a fraction of this acetylacetonate is introduced during the productive phase.

The final composition thus obtained can subsequently be calendered, for example in the form of a sheet, or else extruded, for example to form a rubber profiled element used for the manufacture of a semi-finished product or composite, such as, for example, plies, bands, underlayers or other rubber blocks, which may or may not be reinforced with metal reinforcing members, intended to form, for example, a portion of the structure of a tire.

The vulcanisation (or curing) can subsequently be carried out in a known way at a temperature generally of between 130° C. and 200° C., preferably under pressure, for a sufficient time which can vary, for example, between 5 and 90 min, depending in particular on the curing temperature, the vulcanisation system adopted and the vulcanisation kinetics of the composition under consideration.

The invention relates to the rubber compositions and composites both in the "raw" state (i.e., before curing) and in the "cured" or vulcanised state (i.e., after vulcanisation).

Examples of The Implementation of The Invention

A) Use of the Composition of the Invention in a Tire

The rubber composition of the invention described above can be used for the manufacture of any semi-finished article or product made of rubber, in particular in tires for motor vehicles, whether this composition is external or internal with regard to the structure of the tire.

"External" composition (or mixture) is understood here to mean any part made of rubber of the tire which opens onto the outside of the tire, in other words which is in contact with the air or with an inflation gas; mention will in particular be made, as preferred examples, of the tread, side walls or airtight layer of the tire.

"Internal" composition (or mixture) is understood to mean, in contrast, any part made of rubber of the tire which does not open onto the outside of the tire, in other words which is not in contact with the air or an inflation gas, which is thus situated in the actual inside of the structure of the tire; mention will in particular be made, as examples, of the calendering mixtures present in the bead region, the carcass reinforcement or the crown reinforcement of the tire.

The rubber composition of the invention can also be used for the manufacture of a metal/rubber composite, whether or not this composite is intended to be incorporated in a tire. This composite can be provided in varied forms, for example in the form of a ply, of a band or strip or of a rubber block in which the metal reinforcing member is incorporated, or also of a rubber sheath encasing the metal reinforcing member, the latter being in direct contact with the rubber composition. The final adhesion between the metal and the rubber composition can be obtained on conclusion of the curing of the finished article comprising the composite;

preferably, this curing is carried out under pressure. The composites according to the invention are preferably intended for tires, in particular for radial tires, in order to form all or part of the crown reinforcement, of the carcass reinforcement or of the reinforcement of the bead region of such tires.

By way of example, the appended FIGURE represents, highly diagrammatically, a radial cross section of a tire 1 with radial carcass reinforcement in accordance with the invention, for example intended for a heavy duty vehicle or for a passenger vehicle in this general representation.

This tire 1 comprises a crown 2, two side walls 3, two beads 4 and a carcass reinforcement 7 extending from one bead to the other. The crown 2, surrounded by a tread (not represented in this diagrammatic FIGURE, for simplicity), is in a way known per se reinforced by a crown reinforcement 6 composed, for example, of at least two superimposed crossed crown plies ("working" crown plies), optionally covered with at least one protective ply or one hooping crown ply at zero degrees. The carcass reinforcement 7 is wound around the two bead threads 5 in each bead 4, the turn-up 8 of this reinforcement 7 being, for example, positioned toward the outside of the tire 1, which is here represented fitted to its wheel rim 9. The carcass reinforcement 7 is composed of at least one ply reinforced by "radial" cables, that is to say that these cables are positioned virtually parallel to one another and extend from one bead to the other, so as to form an angle of between 80° and 90° with the median circumferential plane (plane perpendicular to the axis of rotation of the tire which is situated at mid distance from the two beads 4 and passes through the middle of the crown reinforcement 6).

Of course, this tire 1 additionally comprises, in a known way, a layer of rubber or elastomer 10, commonly referred to as airtight rubber or layer, which defines the radially internal face of the tire and which is intended to protect the carcass ply from the diffusion of air originating from the space interior to the tire. Advantageously, in particular in the case of a tire for a heavy duty vehicle, it can additionally comprise an intermediate reinforcing elastomer layer (not represented in the FIGURE) which is situated between the carcass ply and the airtight layer.

The tire in accordance with the invention has the essential characteristic of comprising, in its structure, at least one composition in accordance with the invention. This composition, in the case of an "internal" composition, can, for example, be a part of the bead region 4 comprising the bead thread 5, a crossed crown ply or a protection ply of the crown reinforcement 6, a ply forming all or part of the carcass reinforcement 7. This composition, in the case of an "external" composition, can be present, for example, in the tread, in the side walls 3 or in the airtight layer 10 of the tire.

According to a specific embodiment of the invention, the rubber composition of the invention can advantageously be used as calendering composition (thus as internal mixture) in the crown reinforcements 6 of all types of tires, for example for passenger vehicles, vans or heavy duty vehicles. Preferably, in such a case, the rubber composition of the invention exhibits, in the vulcanised state (i.e., after curing), an E10 modulus which is greater than 4 MPa, more preferably between 6 and 20 MPa, for example between 6 and 15 MPa.

However, it can also have a just as advantageous use in a carcass reinforcement 7 of a tire for an industrial vehicle, such as a heavy duty vehicle; preferably in such a case, the rubber composition of the invention exhibits, in the vulcanised state, an E10 modulus which is less than 9 MPa, more preferably between 4 and 9 MPa.

B) Ageing Tests

For the requirements of this test, five rubber compositions (denoted hereinafter C-1 to C-5) were prepared, the formulation of which is given in Table 1, the levels of the various products being expressed in phr (part by weight per hundred parts of total elastomer, in this instance composed of 100 phr of NR).

The control composition (C-1) essentially comprises, in addition to the elastomer and the reinforcing filler (carbon black), an antioxidant, zinc oxide, stearic acid, sulphur and a sulphenamide accelerator, a reinforcing resin (phenolic resin plus methylene donor) and a cobalt salt as promoter of adhesion with regard to a metal reinforcing member. These compositions are, for example, intended to constitute the calendering rubber of a crown reinforcement of a tire.

The compositions of the invention, C-2 to C-5, all in accordance with the invention, differ only in the additional presence of an acetylacetonate (respectively K, Na, Mg or Ca acetylacetonate). The various acetylacetonates tested were introduced at an isomolar concentration of acetylacetonate, which explains the differences in concentration by weight (in phr) in Table 1.

These compositions were manufactured in the following way: the reinforcing filler (carbon black), the diene elastomer (NR), an antioxidant and, if appropriate, an acetylacetonate, and also various other ingredients, with the exception of the vulcanisation system, were successively introduced into an internal mixer, the initial vessel temperature of which was approximately 60° C.; the mixer was thus approximately 70% filled (% by volume). Thermomechanical working (non-productive phase) was then carried out in a stage of approximately 2 to 4 min, until a maximum "dropping" temperature of 165° C. was achieved. The mixture thus obtained was recovered and cooled and then sulphur and an accelerator of sulphenamide type were incorporated on an external mixer (homofinisher) at 30° C., the combined mixture being mixed (productive phase) for several minutes.

The compositions thus obtained are subsequently either calendered in the form of sheets (thickness of 2 to 3 mm) for the measurement of their physical or mechanical properties, on the one hand, and for carrying out the ageing tests, on the other hand.

The mechanical properties of these compositions have been listed in the appended Table 2. It should be noted that all these compositions have virtually equivalent properties, apart from an advantageously greater elongation at break in the presence of the two preferred acetylacetonates of Mg or of Ca (compositions C-4 and C-5).

After curing the compositions (25 min at 150° C.), the rubber blocks are placed in an oven at a temperature of 55° C., under relative humidity of 60%, for one to several weeks, in order to compare the kinetics of reduction in the level of antioxidant of the compositions during this accelerated ageing. The level of antioxidant was measured by a known HPLC (high performance liquid chromatography) technique, on the one hand in the initial state, on non-aged test specimens, that is to say directly on exiting from the curing, and, on the other hand, after ageing for one to eight weeks.

The results obtained are given in the appended Table 3. The level of antioxidant in the compositions is expressed in relative units, the base 100 being selected for the control composition in the initial state (i.e., after exiting from the curing).

On reading this Table 3, it is first of all found that, unexpectedly, the presence of an alkali metal or alkaline earth metal acetylacetonate already makes it possible, immediately after curing (initial state), to substantially (approximately 7%) reduce the loss of antioxidant present in the compositions, whatever the acetylacetonate tested.

In addition, after accelerated thermal ageing, it is noted that, whatever the duration of the ageing and the acetylacetonate tested, the presence of the alkali metal or alkaline earth metal acetylacetonate makes it possible to reduce, in a noteworthy fashion, the consumption of antioxidant over time, in comparison with the control composition. From this viewpoint, best results are obtained with magnesium and calcium acetylacetonate.

In conclusion, the above thermal ageing tests clearly demonstrate that the addition of an alkali metal or alkaline earth metal acetylacetonate, therefore operating as an antidegradant, makes it possible to substantially reduce the consumption of antioxidant in the rubber compositions, thus affording the vulcanisates and thus also the tires comprising them a potentially improved longevity due to better protection against the ageing due to oxidation.

TABLE 1

| Formulation of the rubber compositions (in phr): | C-1 | C-2 | C-3 | C-4 | C-5 |
|---|---|---|---|---|---|
| Diene elastomer (1) | 100 | 100 | 100 | 100 | 100 |
| Carbon black (2) | 55 | 55 | 55 | 55 | 55 |
| Antioxidant (3) | 2.3 | 2.3 | 2.3 | 2.3 | 2.3 |
| Zinc oxide | 8 | 8 | 8 | 8 | 8 |
| Stearic acid | 0.2 | 0.2 | 0.2 | 0.2 | 0.2 |
| Methylene acceptor (4) | 0.7 | 0.7 | 0.7 | 0.7 | 0.7 |
| Methylene donor (5) | 2.0 | 2.0 | 2.0 | 2.0 | 2.0 |
| Cobalt compound (6) | 1.8 | 1.8 | 1.8 | 1.8 | 1.8 |
| K acetylacetonate (7) | — | 2.0 | — | — | — |
| Na acetylacetonate (8) | — | — | 1.7 | — | — |
| Mg acetylacetonate (9) | — | — | — | 1.7 | — |
| Ca acetylacetonate (10) | — | — | — | — | 1.6 |
| Antireversion agent (11) | 1.8 | 1.8 | 1.8 | 1.8 | 1.8 |
| Sulphur | 5 | 5 | 5 | 5 | 5 |
| Sulphenamide accelerator (12) | 0.7 | 0.7 | 0.7 | 0.7 | 0.7 |

(1) Natural rubber;
(2) N326 (name according to Standard ASTM D-1765);
(3) N-(1,3-Dimethylbutyl)-N'-phenyl-p-phenylenediamine ("Santoflex 6PPD" from Flexsys);
(4) Resorcinol (Sumitomo);
(5) HMT (hexamethylenetetraamine - Degussa);
(6) Cobalt naphthenate (Aldrich - Product No. 544574);
(7) K acetylacetonate (Alfa-Aesar - Product No. B24165);
(8) Na acetylacetonate (Alfa-Aesar - Product No. B24009);
(9) Mg acetylacetonate (Alfa-Aesar - Product No. 12532);
(10) Ca acetylacetonate (Alfa-Aesar - Product No. 30526);
(11) Sodium hexamethylene thiosulphate ("Duralink HTS" from Flexsys);
(12) N-(tert-Butyl)-2-benzothiazylsulphenamide ("Santocure TBBS" from Flexsys).

TABLE 2

| Composition No: | C-1 | C-2 | C-3 | C-4 | C-5 |
|---|---|---|---|---|---|
| Properties before curing: | | | | | |
| Mooney (MU) | 72 | 72 | 70 | 67 | 73 |
| T5 (min) | 8 | 3 | 4 | 5 | 4 |
| T95 (min) | 12 | 14 | 12 | 11 | 11 |
| Properties after curing: | | | | | |
| E10 (MPa) | 7.4 | 8.4 | 8.5 | 7.7 | 8.1 |
| E100 (MPa) | 1.8 | 1.8 | 1.8 | 1.6 | 1.7 |
| E300 (MPa) | 0.9 | 0.8 | 0.8 | 0.7 | 0.8 |
| Breaking stress (MPa) | 27 | 26 | 26 | 26 | 26 |
| Elongation at break (%) | 360 | 360 | 360 | 400 | 400 |

TABLE 3

| % by weight of antioxidant in the rubber composition (in relative units) | C-1 | C-2 | C-3 | C-4 | C-5 |
|---|---|---|---|---|---|
| Initial state (after curing) | 100 | 107 | 107 | 107 | 107 |
| After ageing for 1 week | 75 | 85 | 86 | 88 | 89 |
| After ageing for 2 weeks | 63 | 71 | 73 | 77 | 77 |
| After ageing for 4 weeks | 42 | 45 | 47 | 55 | 55 |
| After ageing for 8 weeks | 32 | 34 | 35 | 43 | 44 |

The invention claimed is:

1. A rubber composition, usable in particular in the manufacture of a tire, comprising at least a diene elastomer, that is natural rubber, between 30 and 150 phr of a reinforcing filler, a crosslinking system, between 0.2 and 10 phr of an antioxidant and between 0.2 and 10 phr of an alkali metal or alkaline earth metal acetylacetonate.

2. The rubber composition according to claim 1, the reinforcing filler being chosen from the group consisting of carbon black, inorganic fillers and the mixtures of such fillers.

3. The rubber composition according to claim 2, the reinforcing filler being chosen from the group consisting of carbon black, silica and the mixtures of such fillers.

4. The rubber composition according to claim 1, the crosslinking system being based on sulphur and on an accelerator.

5. The rubber composition according to claim 1, the metal of the acetylacetonate being chosen from the group consisting of lithium, sodium, potassium, calcium, magnesium and mixtures of these compounds.

6. The rubber composition according to claim 5, the acetylacetonate being magnesium acetylacetonate or calcium acetylacetonate.

7. The rubber composition according to claim 1, the level of the alkali metal or alkaline earth metal acetylacetonate being between 0.3 and 6 phr.

8. The rubber composition according to claim 1, additionally comprising a cobalt salt.

9. The rubber composition according to claim 8, the cobalt salt being chosen from the group consisting of the abietates, acetylacetonates, tallates, naphthenates, resinates and the mixtures of these compounds.

10. The rubber composition according to claim 1, the antioxidant being chosen from the group consisting of substituted p-phenylenediamines, substituted diphenylamines, substituted triphenylamines, quinoline derivatives and the mixtures of such compounds.

11. The rubber composition according to claim 10, the antioxidant being chosen from the group consisting of substituted p-phenylenediamines and the mixtures of such diamines.

12. The tire comprising a composition according to claim 1.

13. The tire according to claim 12, the composition being a composition external to the tire, that is to say which is in contact with the air or with an inflation gas.

14. The tire according to claim 12, the composition being a composition internal to the tire, that is to say which is not in contact with the air or with an inflation gas.

15. A metal/rubber composite comprising a rubber composition according to claim 1 and at least a metal reinforcing member, the latter being in direct contact with the rubber composition.

16. The rubber composition according to claim 1, the level of the alkali metal or alkaline earth metal acetylacetonate being between 0.5 and 4 phr.

* * * * *